United States Patent
Minbiole et al.

(10) Patent No.: US 8,220,226 B2
(45) Date of Patent: Jul. 17, 2012

(54) ELECTRON BEAM IRRADIATION OF BULK MATERIAL SOLIDS

(75) Inventors: Paul R. Minbiole, Cincinnati, OH (US); Daniel F. Yasenchak, Lebanon, OH (US); David W. Keenan, Springboro, OH (US)

(73) Assignee: E-Beam Services, Inc., Lebanon, OH (US)

(*) Notice: Subject to any disclaimer, the term of this patent is extended or adjusted under 35 U.S.C. 154(b) by 292 days.

(21) Appl. No.: 12/535,368

(22) Filed: Aug. 4, 2009

(65) Prior Publication Data
US 2011/0031657 A1    Feb. 10, 2011

(51) Int. Cl.
*B65B 63/00* (2006.01)
(52) U.S. Cl. ......................... 53/428; 53/111 R
(58) Field of Classification Search ............ 53/428, 53/432, 440, 111 R, 111 RC, 510, 127
See application file for complete search history.

(56) References Cited

U.S. PATENT DOCUMENTS

| | | | | |
|---|---|---|---|---|
| 2,741,704 A | * | 4/1956 | Trump et al. | 250/492.3 |
| 2,887,584 A | * | 5/1959 | Nygard | 250/453.11 |
| 3,676,673 A | * | 7/1972 | Coleman | 250/453.11 |
| 3,766,031 A | * | 10/1973 | Dillon | 522/156 |
| 4,174,293 A | * | 11/1979 | Colombo et al. | 588/4 |
| 4,677,014 A | * | 6/1987 | Bechen | 428/195.1 |
| 4,748,005 A | | 5/1988 | Neuberg et al. | |
| 4,916,198 A | | 4/1990 | Scheve et al. | |
| 5,047,446 A | | 9/1991 | DeNicola, Jr. | |
| 5,047,485 A | | 9/1991 | DeNicola, Jr. | |
| 5,541,236 A | | 7/1996 | DeNicola, Jr. et al. | |
| 5,554,668 A | | 9/1996 | Scheve et al. | |
| 5,591,785 A | | 1/1997 | Scheve et al. | |
| 5,605,936 A | | 2/1997 | DeNicola, Jr. et al. | |
| 5,718,101 A | * | 2/1998 | Noel et al. | 53/432 |
| 5,731,362 A | | 3/1998 | Scheve et al. | |
| 5,847,401 A | * | 12/1998 | McKeown et al. | 250/396 ML |
| 5,916,929 A | * | 6/1999 | Knobel et al. | 522/155 |
| 6,340,718 B1 | * | 1/2002 | Korenev et al. | 522/156 |
| 6,713,773 B1 | * | 3/2004 | Lyons et al. | 250/492.3 |
| 2011/0031657 A1 | * | 2/2011 | Minbiole et al. | 264/485 |

FOREIGN PATENT DOCUMENTS
JP    2002114852    4/2002

OTHER PUBLICATIONS
Written Opinion of the International Searching Authority for PCT/US2010/044219, dated Nov. 23, 2010.

\* cited by examiner

*Primary Examiner* — Paul R Durand
(74) *Attorney, Agent, or Firm* — Wood, Herron & Evans, LLP

(57) ABSTRACT

Bulk material solids are packaged in a shaped block and the packaged block is irradiated on two sides using high-energy electron beam radiation to uniformly irradiate the solids in the package.

26 Claims, 2 Drawing Sheets

ELECTRON BEAM IRRADIATION OF BULK MATERIAL SOLIDS

FIELD OF THE INVENTION

This invention relates to a method of electron beam irradiation of bulk material solids using high-energy radiation to improve various physical and mechanical properties.

BACKGROUND OF THE INVENTION

Many types of products are created or improved by electron beam (e-beam) processing. Products include appliance parts, gaskets, manifolds, tubing, electrical connectors, molded parts, resin pellets, etc. The possibilities are endless because, in many polymers, property improvements can be attained through e-beam processing. Commodity resins and polymeric materials including polyethylene, ethylene vinyl acetate, polyvinyl chloride, polyamides, and certain types of rubber, such as neoprene, silicone, and ethylene-propylene rubbers, can all realize substantial property enhancement. Property improvements of these polymeric materials may include an increase in tensile strength, impact strength, abrasion resistance, chemical resistance, heat deflection, modulus, hardness, service temperature, barrier properties, crack-resistance, creep resistance, and fatigue resistance. Other special attributes can be imparted to polymers, such as heat-shrink properties, positive temperature coefficient properties, and various other special properties achieved by crosslinking or scission of polymers. Electron beam processing is also used for crystal structure modification (gemstone coloration) and to increase silicon solid-state devices' switching speed, further demonstrating the breadth of possibilities.

Notwithstanding the value of the properties that are created or improved by e-beam processing, efficient radiation techniques are needed. For example, the tray radiation technique for e-beam radiation of bulk material solids is well known. In U.S. Pat. No. 3,766,031 (Dillon), bulk material solids are irradiated in trays. Inefficiencies in this process are due to overscan of the trays with the e-beam and the penetration characteristics (depth-dose) of the electron beam. The latter efficiency loss in the tray irradiation technique arises out of the fact that the dose received by the layer of material varies with its depth. Beam energy and/or material depth are often adjusted so that an equal dose is effected at the opposed surfaces of the material. Radiation in excess of the necessary dose, and radiation that passes entirely through the material, is not utilized. This inefficiency, i.e., the depth-dose characteristic, can cause processing inefficiency of more than 50%, and in some instances may result in undesirable properties in the resulting product.

Improvements in the tray irradiation technique have been achieved as disclosed in U.S. Pat. No. 4,748,005 (Neuberg and Luniewski). In order to overcome the inefficiency of the tray irradiation technique and the most inefficient depth-dose characteristic of processing, a method and apparatus was disclosed in the '005 patent for radiation degradation processing, which makes use of simultaneous irradiation, agitation, and cooling. Agitation of bulk material polymer powder during processing results in a more uniform and efficient method of exposing the polymeric material to radiation. Thus, the prior techniques of irradiation by sequential exposure to doses of radiation were improved according to this technique. Another example of more efficiently irradiating and modifying solid organic polymers with high-energy radiation is disclosed in U.S. Pat. No. 5,916,929 (Knobel and Minbiole). According to this patent, the efficiency of irradiating bulk material polymer solids is improved by passing the solids through an irradiation zone, and irradiating only a central portion of the polymer particles, followed by mixing the irradiated and un-irradiated polymer particles and reintroducing the mixture into the radiation zone for the production of polymer particles which have been more uniformly treated with radiation.

In addition to the above techniques for improvement of electron-beam processing, a number of patents have been granted for processing polymeric bulk material solids, such as polypropylene, and other polyolefin polymers, to improve melt strength, heat resistance, or other physical properties, including U.S. Pat. Nos. 4,916,198; 5,047,446; 5,047,485; 5,541,236; 5,554,668; 5,591,785; 5,605,936; and 5,731,362. In general, the processes described in these patents involve treatment of finely divided polymeric material, which is layered on a traveling belt in the required environment. The speed of the traveling belt is selected so that the layer of finely divided polymeric material passes through the electron beams at a rate to receive the desired dose of radiation. Other process steps may be involved such as treatment of the irradiated polymers in a fluidized bed with nitrogen or inert gas. Expensive equipment is employed to process the polymeric particles in the environmentally-controlled zone.

In summary, there is a need for handling bulk material solids for electron beam processing, and maintaining environmental control during processing. There is also a further need to efficiently control dosage of electron beams and improve on the inefficiencies of the prior art processes. The elimination of expensive processing steps and apparatus of known methods would be desirable. Accomplishing the desired methods, controlling the environment surrounding the product, and achieving other efficiencies and controls would be highly desirable.

SUMMARY OF THE INVENTION

This invention is directed to a method of e-beam processing bulk material solids. Bulk material solids, according to this invention, are handled in a most efficient manner under controlled conditions, which overcomes the efficiency losses arising out of prior techniques.

"Bulk material solids" are defined, according to this invention, as those solid materials which are ordered, stored, or sold by weight or volume. Typically, the bulk material solids are handled in large quantities and are loose, free-flowing products. For example, bulk material solids may consist of polymer particles or pellets, such as polyethylene, ethylene vinyl acetate, polypropylene, polytetrafluoroethylene, polybutadiene, and other thermoplastic and/or thermosetting polymer particles. Bulk material solids also include large quantities of small formed polymer parts, such as nuts, screws, bolts, washers, spacers, rivets, spray nozzles, filters, fittings, adapters, plugs, tubing, strainers, bottles, vials, gaskets, o-rings, seals, probes, couplings, connectors, cable ties, bearings, wheels, bumpers, rollers, sheaves, gears, bushings, belts, and other functional polymeric parts and which are irradiated to improve the properties of said parts.

The inventive method of electron beam processing of bulk material solids includes packing bulk material solids in a container having first and second opposed sides which define an internal container zone for irradiating the bulk material solids. A layer of the bulk material solids is formed at a predetermined, substantially uniform solid thickness in the internal container zone. The opposed sides of the container are in contact with the bulk material solids and the container is sealed to provide a controlled internal atmosphere within the internal container zone. The container is passed through an electron beam radiation zone. Each of the first and second sides are exposed to a dose of e-beam radiation which passes through each side for irradiating the bulk material solids. In essence, the inventive method calls for a 2-sided e-beam processing of packaged bulk materials, thus converting loose bulk materials into a substantially solid packaged layer in the form of an essentially rectangular block.

The sealed container for the bulk material solids, in the form of a block, is easily handled and contains the bulk material solids. One side of the sealed container block is then passed through an electron beam radiation zone and the opposed side is then also irradiated. The bulk material solid layer in the internal container zone is more uniformly irradiated by exposing each of the first and second sides of the container to a dose of electron beam radiation which passes through each respective container side for irradiating the bulk material solids.

In one preferred form of the process, the bulk material solids consist of particles (powders, pellets, chips, etc.) of thermoplastic polymers. More particularly, the polymers are exemplified by polyethylene, polyvinylchloride, polypropylene, polytetrafluorethylene, polyethylene terephthalate, polybutylene terephthalate, polyamide, ethylene vinyl acetate, thermoplastic polyurethane, chlorosulfonated polyethylene, polyester, polyvinylidene fluoride, ethylene tetrafluoroethylene, ethylene chlorotrifluoroethylene, chlorinated polyvinylidene chloride, fluorinated ethylene propylene, fluoroelastomer, polyester thermoplastic elastomer, neoprene rubber, silicone rubber, styrene-butadiene rubber, and ethylene-propylene rubber.

Property improvements for these materials as a result of electron beam processing may include an increase in tensile strength, impact strength, abrasion resistance, chemical resistance, heat deflection, modulus, hardness, surface temperature, barrier properties, stress-crack resistance, creep resistance, and fatigue resistance. In the case of polytetrafluoroethylene, irradiation enables the subsequent creation of micropowders. This inventive process of electron beam processing can also be used for crystal structure modification (gemstone coloration) and to increase silicon solid-state device switching speed. As indicated above, polymer parts such as nuts, screws, bolts, washers, spacers, rivets, spray nozzles, filters, fittings, adapters, plugs, tubing, strainers, bottles, vials, gaskets, o-rings, seals, probes, couplings, connectors, cable ties, bearings, wheels, bumpers, rollers, sheaves, gears, bushings, belts, and other functional polymeric parts can also be electron beam processed to improve properties using this inventive process.

The atmosphere in the sealed container can be controlled. For example, the controlled internal atmosphere in the container can be established by evacuating the container. Alternatively, an inert gas or a chemically-active material can be introduced into the container before it is sealed. A chemically-active material, such as a gas (oxygen) may be used to react with the bulk material solids to modify the physical and/or chemical properties of the solids.

As stated above, the container is preferably in the shape of a rectangular block having first and second sides which are in direct contact with the bulk material solid layer contained in the container. The bulk material solid layer has a thickness which is substantially perpendicular to the direction of the incident electron beam, which is appropriate for relatively uniform internal doses using the 2-sided irradiation technique, given the penetration limitations of the actual energy (MeV) of the electron beam. The workable ranges of density of the container are approximately 0.8-1 gram per square centimeter for 1 MeV electrons, approximately 2 grams per square centimeter for 2 MeV electrons, approximately 3 grams per square centimeter for 3 MeV electrons, etc., up to approximately 10 grams per square centimeter for 10 MeV electrons.

The entire container may be formed of a gas-impermeable sheet material, typically a plastic film of about 0.5 to 12 mil in thickness, (i.e., 0.01 mm to 0.3 mm), thereby not materially affecting the energy of the electron beams which pass through the top and bottom faces. Alternatively, re-usable containers with rigid formed sides and with gas impermeable sheet material, such as plastic film or thin metal foil, on the opposed faces may be used. The plastic film is exemplified by a nylon or polyethyleneterephthalate film. The plastic film is capable of withstanding the passage of the electron beams and maintaining the container's sealed atmosphere during electron-beam processing. The controlled atmosphere in the container can be established by drawing a vacuum or, where an inert atmosphere is desirable during electron-beam processing, nitrogen or other inert gas may be employed in the sealed container. Where a chemically-active environment is desirable during electron-beam processing, a suitable gas or fluid may be introduced. For example, where polyolefin polymer particles are irradiated to provide long-chain branching of the polyolefin polymer in the particles, it is desirable to control the atmosphere by drawing a vacuum or introducing into the internal container zone a nitrogen or other inert gas atmosphere, so as not to interfere with the desired processing. Alternatively, a high oxygen atmosphere may be desired, for example, in the electron beam processing of polytetrafluoroethylene to reduce the molecular weight of the material for the subsequent production of polytetrafluoroethylene micropowders by milling.

Other embodiments and features of the method of this invention will be understood with reference to the following Drawings and Detailed Description.

DETAILED DESCRIPTION OF THE INVENTION

One objective of this invention is to efficiently handle bulk material solids for electron beam processing. Another objective is to electron beam process bulk material solids and environmentally control the process. Environmental control is achieved by packaging the bulk material solids in an essentially solid form of a container for electron-beam processing. The bulk material solids are held within the container and undesired environmental effects are avoided by processing the materials within the container. The inventive technique avoids inefficient electron beam processing and/or unnecessary processing steps which have heretofore been practiced in the prior art, such as multiple exposures to doses of radiation and stirring the bulk material solids between exposures as in U.S. Pat. No. 5,916,929. The invention also eliminates expensive, time-consuming and inefficient operations. The container of bulk material solids is shaped for control of the radiation dose. The previous problems with depth-dose efficiency losses are reduced by the advantageous effects of the 2-sided electron-beam processing of the package. Furthermore, the bulk material solids in the package during and after processing can be handled effectively and conveniently, and such handling advantages can be enjoyed in subsequent treatment steps in certain applications. The packaging, preferably, is a plastic film which can be easily disposed of or is potentially reusable or recyclable. Alternatively, re-usable containers with rigid formed sides with gas impermeable sheet material on opposed faces may be used. Other advantages of the method include the elimination of expensive equipment of known methods such as environmentally-controlled chambers, fluidized beds, mixing and/or handling equipment, dust and pollution control equipment, etc. In addition, the potential for contamination with open-traveling beds, or with the prior art technique of tray irradiation, is avoided. More control over the bulk material solids being processed is achieved with the packaging technique of this invention and 2-sided electron-beam radiation.

Additional advantages and objectives of this invention will be understood with reference to the Drawings and following Examples.

Example 1

Figure 1:
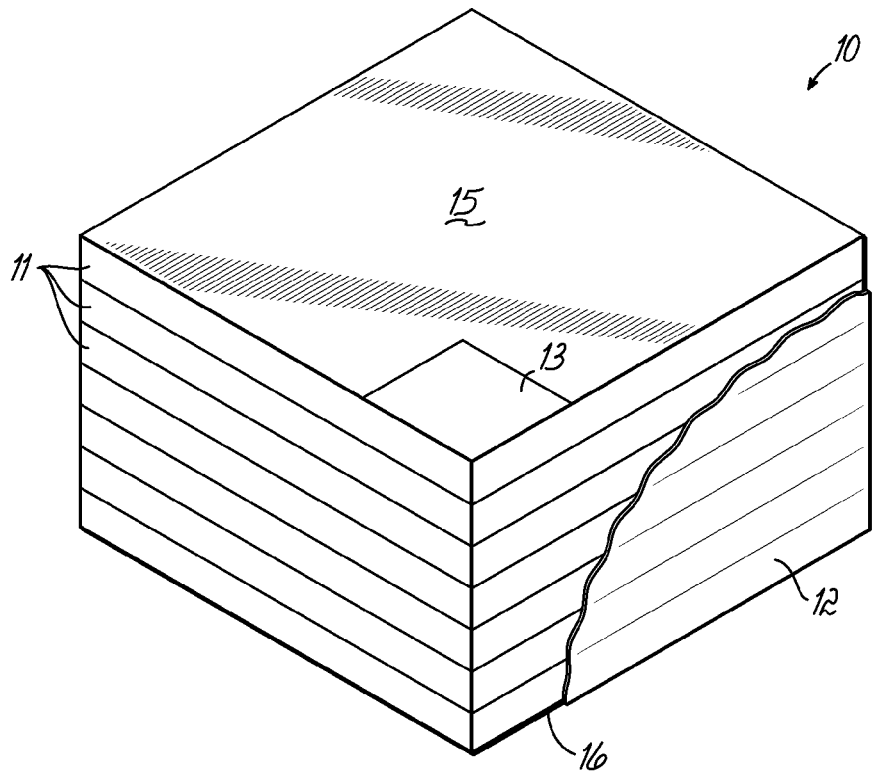
FIG. 1 is a diagrammatic view of a bulk materials solids package used in the method according to the following Example 1.
Figure 3:
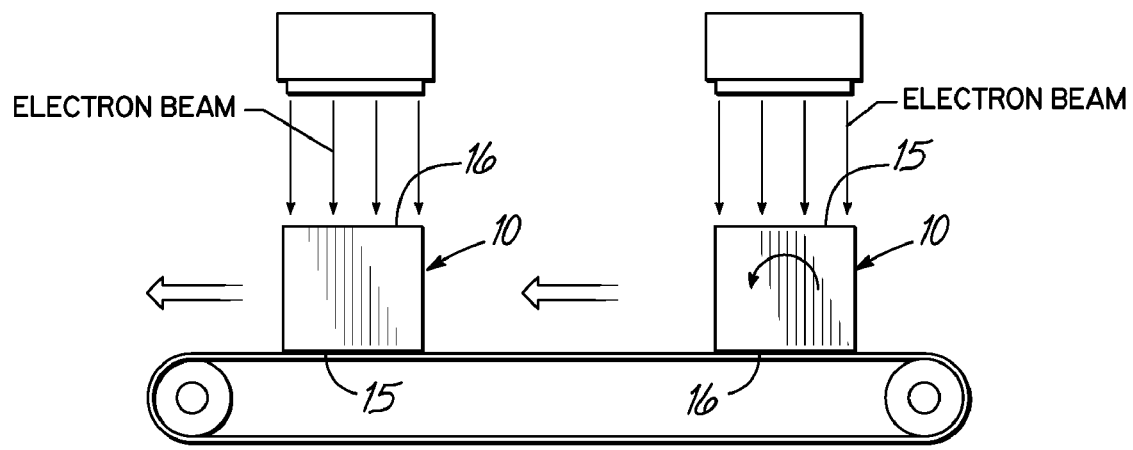
FIG. 3 is a diagrammatic representation of the method according to the description following Example 1.

An example of the application of electron beam irradiation of bulk material solids is the irradiation of ethylene vinyl acetate polymer (EVA) material. In this case the purpose of the radiation is to modify the melt flow rate property of the material from a high starting point, such as is typically produced by the high-volume reactor, into a precise, but lower melt flow rate for a particular end-product requirement. In this example the starting melt flow rate of the EVA material was 16 dg/min (ASTM D1238), and the melt flow rate of the finished product after irradiation was 0.5-1.0 dg/min. The electron beam irradiation would customarily be accomplished in one pass of a relatively thin bed of loose pellets on a horizontal conveyor. However, in this example the EVA pellets were formed into a package made entirely of thin film, such that the loose bulk material became a substantially solid rectangular block, and then the first and second opposed sides were irradiated perpendicular to the beam of electrons for two-sided processing. Because of the two-sided irradiation, the thickness of the EVA block was approximately 2½ times the thickness customary for a single layer, and yet dose uniformity from the top to the bottom of the material was improved. To demonstrate this, a seven-layer bulk material solid package 10 was made, as shown in FIG. 1. FIG. 3 diagrammatically illustrates the method of irradiating sides 15 and 16 of the bulk material solid package 10 shown in FIG. 1. The package 10 was effectively a stack of seven containers 11, each container providing a layer approximately 0.9-1.0 cm in thickness and approximately 20 by 10 cm in lateral dimensions, for the purpose of enabling measurement of internal properties and radiation doses, as described below. Each container 11 was made by filling a nylon film bag of 0.05 mm film thickness with approximately 100 grams of EVA pellets and vacuum sealing to maintain the appropriate thickness and shape. Seven of these filled bags were placed on top of each other and the seven-layer package 10 (layers 1 through 7) was then vacuum sealed with a 0.1 mm nylon film partially shown at 12 into one package 10, an equivalent of a bulk materials solids product unit according to this invention. Thin-film radiochromic dosimeters 13 for measurements (traceable to NIST) were placed on the top 15 and the bottom 16 of the package 10 in addition to in between each container 11. The seven-layer structure enabled the measurement of the entry and exit radiation dose of each layer and the melt flow rate of the irradiated EVA within each layer. One side 15 of the package 10 was irradiated, followed by the other side 16 using 5 MeV electrons. The electron beam accelerator was producing 22 mA of beam with a 1325 mm scan width, and the package 10 was placed on a conveyor moving under the beam at 12 meters/minute during irradiation of both sides. The average dose per layer is reported below in TABLE I for a single-side irradiation and a two-sided irradiation. The results demonstrate the dose uniformity achieved by irradiating the bulk material solids with two-sided irradiation as compared to single-sided irradiation.

TABLE I

| Top of Layer | Dose (kGy) | | Melt Flow Rate (dg/min) | |
| --- | --- | --- | --- | --- |
| | Single-Side Irradiation | Double-Side Irradiation | Single-Side Irradiation | Double-Side Irradiation |
| 1 | 8 | 8 | 0.9 | 0.9 |
| 2 | 9 | 10 | 0.8 | 0.7 |
| 3 | 5 | 9 | 1.3 | 0.6 |
| 4 | 1 | 7 | 10.6 | 0.9 |
| 5 | 0 | 7 | 16.0 | 0.8 |
| 6 | 0 | 9 | 16.0 | 0.6 |
| 7 | 0 | 8 | 16.0 | 0.9 |

Figure 2:
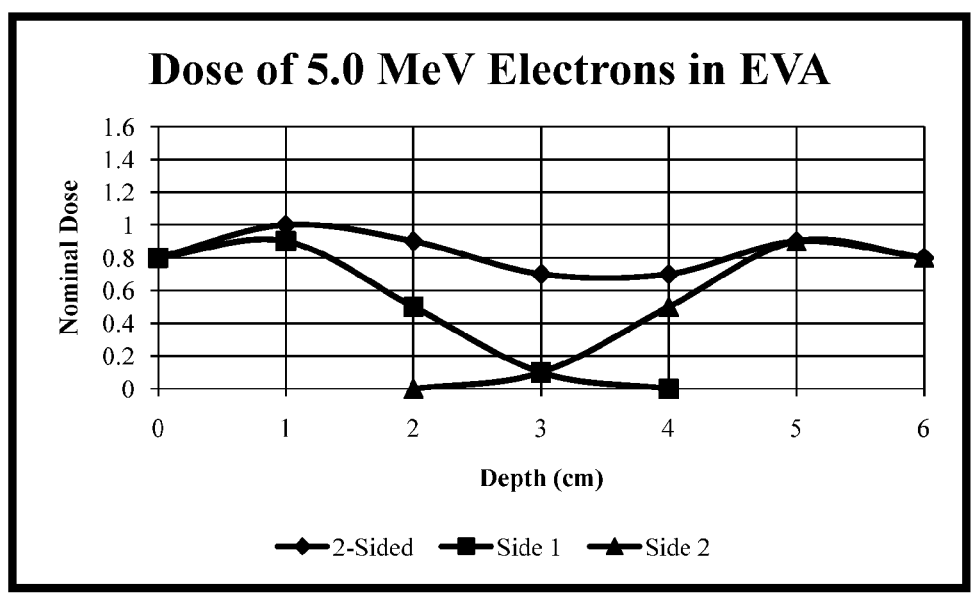
FIG. 2 is a graph of depth-dose curves for Example 1 of this invention which follows.

FIG. 2 is a graph of the depth-dose curves for both the single-side irradiation and double-side irradiation results. The depth-dose curves further demonstrate the dose uniformity achieved by the method of this invention.

Example 2

Another example of the application of electron beam irradiation of bulk material solids is the irradiation of substantially linear polypropylene material. In this case the purpose of the irradiation is to modify the molecular structure of the material by creating long-chain branching. This long-chain branching increases the melt-strength of the material, thereby extending the use of the polypropylene into more applications. The starting material had a melt strength of 2-3 cN and a melt flow rate of 0.7 dg/min (ASTM D1238). Customarily the process of increasing the melt strength of polypropylene consists of irradiation and heat-treatment of the polymer in a low oxygen atmosphere (U.S. Pat. No. 4,916,198). To accomplish this, in customary practice, the loose polypropylene pellets are processed in a thin bed of pellets under the beam and then conveyed into a fluid-bed oven to heat treat the polymer, using large and complex equipment in part due to the need to create and maintain an inert gas environment.

However, in this example, the pellets were formed into a block of approximately 5 cm in thickness with a container density of approximately 3.0 g/cm². When the block was formed, nitrogen was flushed through the material followed by vacuum sealing. The vacuum was approximately −80 kPa. The block was then irradiated on the first and then the second opposed faces at a dose of approximately 50 kGy per side at an energy of 4.0 MeV. The block was then placed in an oven for 15 minutes at 80° C. to provide time for long-chain branching to occur, and then the temperature was increased to 140° C. for 90 minutes to quench the free radicals and end the branching—consistent with the process in U.S. Pat. No. 4,916,198, which is incorporated by reference herein in its entirety.

The resulting melt flow rate was 2.5 dg/min and the melt strength was increased to 30 cN, consistent with the properties achieved in the customary process.

Example 3

Another example of irradiating bulk material solids is in the irradiation of polytetrafluoroethylene (PTFE) flake or scrap material. In this case the purpose of the irradiation was to reduce the molecular weight of the PTFE to enable the subsequent milling of the PTFE into a fine powder. Without the irradiation of the PTFE, milling is very difficult due to the inherent high mechanical strength of the unirradiated polymer. The PTFE material can be placed in a reusable four-sided stainless steel container frame and utilizing stainless steel foil of 0.38 mm thickness on opposed faces. Using this methodology, the PTFE can be processed without creating a dust nuisance from the creation of powder during the irradiation as occurs in customary processing, for example as in U.S. Pat. No. 5,916,929 (Knobel and Minbiole). In this example, the material was processed on the first and second opposed faces, perpendicular to the beam of electrons for two-sided processing. After the irradiation was complete, the material was removed from the irradiation system in a dust-controlled manner and similarly the material is typically loaded into gaylords or drums for shipment.

Example 4

Another example of irradiating bulk material solids is in the irradiation of ethylene propylene diene monomer (EPDM) rubber formed into nozzle tips. The EPDM parts are approximately 10 mm long with a 4 mm diameter. In this case the purpose is to finish the curing process of the rubber using irradiation instead of using high energy ovens for hours of heat treatment. The result of the cure can be measured by hot modulus testing at 100% elongation. In this example, the parts were placed in a thin polyethylene film package, flushed with nitrogen and vacuum sealed to −50 kPa, creating a substantially solid rectangular block prior to irradiation. The first and second opposed sides were irradiated perpendicular to the beam of electrons for two-sided processing at approximately 30 kGy per side resulting in a total dose of approximately 50 kGy. To demonstrate the effectiveness of the irradiation in a controlled environment, dogbone samples were irradiated to 50 kGy in an oxygen controlled environment and a second set were irradiated in an ambient atmosphere. The results of the hot modulus testing of the EPDM dogbone samples are below. By irradiating the EPDM nozzle tips in a reduced oxygen atmosphere, a lower dose of irradiation was needed to complete the cure.

Example 4

Hot Modulus Testing at 120° C., 100% Elongation

| Control, Uncured | Inert Atmosphere, 50 kGy | Ambient Atmosphere, 50 kGy | Ambient Atmosphere, 100 kGy |
|---|---|---|---|
| 200 psi | 260 psi | 220 psi | 235 psi |

Those of ordinary skill in the art realize that the descriptions, procedures, methods and compositions presented above can be revised or modified without deviating from the scope of the described embodiments, and such do not depart from the scope of the invention.

What is claimed is:

1. A method of electron beam processing bulk material solids comprising packing bulk material solids in a container having first and second opposed sides which define an internal container zone for irradiating the bulk material solids, forming a layer of the bulk material solids at a predetermined, substantially uniform solid thickness in the internal container zone, sealing the container to provide a controlled internal atmosphere within the internal container zone and with said sides in direct contact with the bulk material solids layer to form a block of bulk material solids, first passing the sealed container containing the block of bulk material solids through an electron beam radiation zone, and directly exposing the first side of the container to a first dose of electron-beam radiation which passes through the container first side to initially irradiate the block of bulk material solids in the container and, thereafter directly exposing the second side of the container to a second dose of electron-beam radiation which passes through the container second side to further irradiate the initially irradiated block of bulk material solids, whereby said first and second doses uniformly irradiate the bulk material solids.

2. The method of claim 1 wherein the bulk material solids consist of polytetrafluoroethylene (PTFE) particles comprising irradiating the particles to cause scission of the polymer in the particles.

3. The method of claim 2 followed by milling of the irradiated particles to form a PTFE powder.

4. The method of claim 1 wherein said bulk material solids consist of polymer particles comprising irradiating the polymer particles to provide long chain branching, curing, or cross-linking of the polymer in the particles.

5. The method of claim 1 wherein said bulk material solids consist of particles of substantially linear polypropylene polymer or copolymers thereof comprising irradiating the particles to provide long-chain branched propylene polymers or copolymers and heating the irradiated particles while in said sealed container to facilitate long-chain branching and then further heating to deactivate substantially all free radicals present in the irradiated material.

6. The method of claim 5 wherein said container is sealed with said particles under a nitrogen or other inert gas atmosphere.

7. The method of claim 5 wherein the controlled internal atmosphere is established by evacuating the container.

8. The method of claim 1 wherein said bulk material solids consist of a polymer selected from the group consisting of polyethylene, polyvinylchloride, polypropylene, polytetrafluorethylene, polyethylene terephthalate, polybutylene terephthalate, polyamide, ethylene vinyl acetate, thermoplastic polyurethane, chlorosulfonated polyethylene, polyester, polyvinylidene fluoride, ethylene tetrafluoroethylene, ethylene chlorotrifluoroethylene, chlorinated polyvinylidene chloride, fluorinated ethylene propylene, fluoroelastomer, polyester thermoplastic elastomer, neoprene rubber, silicone rubber, styrene-butadiene rubber, and ethylene-propylene rubber.

9. The method of claim 1 wherein said bulk material solids consist of polymer parts selected from the group of nuts, screws, bolts, washers, spacers, rivets, spray nozzles, filters, fittings, adapters, plugs, tubing, strainers, bottles, vials, gaskets, o-rings, seals, probes, couplings, connectors, cable ties, bearings, wheels, bumpers, rollers, sheaves, gears, bushings, belts, and other functional polymeric parts and which are irradiated to improve the properties of said parts.

10. The method of claim 1 comprising the further step of recovering the bulk material solids from the container after irradiation.

11. The method of claim 1 wherein the controlled internal atmosphere is established by evacuating the container.

12. The method of claim 1 wherein said container is sealed with said particles under a nitrogen or other inert gas atmosphere.

13. The method of claim 1 wherein said container is sealed with a selected chemically-active material inside the container.

14. The method of claim 1 wherein the container is generally in the shape of a rectangular block having said first and second sides which are in direct contact with the bulk material solids layer contained in the container to facilitate processing of the block.

15. The method of claim 1, wherein said bulk material solids layer has a thickness substantially perpendicular to the direction of electron beam radiation and the density ranges of the container are from approximately 0.8 to 1 gram per square centimeter for 1 MeV electrons up to approximately 10 grams per square centimeter for 10 MeV electrons.

16. The method of claim 1 wherein the container is formed of a gas impermeable sheet material having the first and second opposed sides.

17. The method of claim 16 wherein the gas impermeable sheet material is a plastic film or metal foil.

18. The method of claim 1 comprising vacuum packing the bulk material solids in a gas impermeable container having the first and second opposed sides.

19. The method of claim 18 wherein an inert gas, is introduced into the container to establish the controlled internal atmosphere.

20. A method of electron beam processing bulk polymeric material solids comprising
packing bulk polymeric material solids in a generally rectangular plastic film container having first and second opposed sides which define an internal container zone for irradiating the bulk polymeric material solids,
forming a layer of the bulk polymeric material solids at a predetermined substantially uniform solid thickness in the internal container zone,
sealing the container to provide a controlled internal atmosphere within the internal container zone and with said sides in direct contact with the bulk polymeric material solids layer to form a rectangular block of bulk polymeric material solids,
first passing the sealed container containing the block of bulk material solids through an electron beam radiation zone with said bulk polymeric material solids thickness substantially perpendicular to the direction of the electron beam and directly exposing the first side of the container to a first dose of electron-beam radiation which passes through the container first side to initially irradiate the block of bulk material solids in the container and,
thereafter directly exposing the second side of the container to a second dose of electron-beam radiation which passes through the container second side to further irradiate the initially irradiated block of bulk material solids, whereby said first and second doses uniformly irradiate the bulk material solids.

21. The method of claim 20 wherein the bulk material solids consist of polytetrafluoroethylene (PTFE) particles comprising irradiating the particles to cause scission of the polymer in the particles and milling of the irradiated particles to form a PTFE powder.

22. The method of claim 20 wherein said bulk material solids consist of particles of substantially linear polyolefin polymer comprising irradiating the particles sealed in said container under a nitrogen atmosphere to provide long-chain branched polyolefin polymers or copolymers and heating the irradiated particles while in said sealed container to deactivate substantially all free radicals present in the irradiated material.

23. The method of claim 20 wherein said bulk material polymeric solids are selected from the group consisting of polyethylene, polyvinylchloride, polypropylene, polytetrafluorethylene, polyethylene terephthalate, polybutylene terephthalate, polyamide, ethylene vinyl acetate, thermoplastic polyurethane, chlorosulfonated polyethylene, polyester, polyvinylidene fluoride, ethylene tetrafluoroethylene, ethylene chlorotrifluoroethylene, chlorinated polyvinylidene chloride, fluorinated ethylene propylene, fluoroelastomer, polyester thermoplastic elastomer, neoprene rubber, silicone rubber, styrene-butadiene rubber, and ethylene-propylene rubber.

24. The method of claim 20 wherein said bulk material polymeric solids consist of polymer parts selected from the group of nuts, screws, bolts, washers, spacers, rivets, spray nozzles, filters, fittings, adapters, plugs, tubing, strainers, bottles, vials, gaskets, o-rings, seals, probes, couplings, connectors, cable ties, bearings, wheels, bumpers, rollers, sheaves, gears, bushings, belts, and other functional polymeric parts and which are irradiated to improve the properties of said parts.

25. The method of claim 20 comprising the further step of recovering the bulk polymeric material solids from the container after irradiation.

26. The method of claim 20, wherein said bulk material solids layer has a thickness substantially perpendicular to the direction of electron beam radiation and the density ranges of the container are from approximately 0.8 to 1 gram per square centimeter for 1 MeV electrons up to approximately 10 grams per square centimeter for 10 MeV electrons.

* * * * *